US009697106B1

(12) United States Patent
Leong et al.

(10) Patent No.: US 9,697,106 B1
(45) Date of Patent: *Jul. 4, 2017

(54) METHOD FOR VERIFYING HISTORICAL ARTIFACTS IN DISPARATE SOURCE CONTROL SYSTEMS

(71) Applicant: International Business Machines Corporation, Armonk, NY (US)

(72) Inventors: Joseph C. Leong, West Lafayette, IN (US); Lauren J. Hayward Schaefer, Newark, DE (US); David G. Terry, Nashua, NH (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/222,126

(22) Filed: Jul. 28, 2016

Related U.S. Application Data

(63) Continuation of application No. 15/011,149, filed on Jan. 29, 2016, now Pat. No. 9,430,748.

(51) Int. Cl.
*G06F 9/44* (2006.01)
*G06F 11/36* (2006.01)

(52) U.S. Cl.
CPC ............ *G06F 11/3668* (2013.01); *G06F 8/71* (2013.01)

(58) Field of Classification Search
CPC ............................................. G06F 8/71
See application file for complete search history.

(56) References Cited

U.S. PATENT DOCUMENTS

| 5,623,661 A | 4/1997 | Hon |
| 5,675,802 A | 10/1997 | Allen |
| 5,907,705 A * | 5/1999 | Carter .................... G06Q 10/06 717/121 |

(Continued)

OTHER PUBLICATIONS

Palomba, Fabio, et al. "Detecting bad smells in source code using change history information." Automated software engineering (ASE), 2013 IEEE/ACM 28th international conference on. IEEE, 2013.*

(Continued)

*Primary Examiner* — Matthew Brophy
(74) *Attorney, Agent, or Firm* — Sherman IP LLP; Kenneth L. Sherman; Joshua A. Schaul

(57) ABSTRACT

A method for verifying historical artifacts in disparate source control systems. The method comprises obtaining historical artifacts from a target repository; obtaining historical artifacts from a source repository; and verifying the historical artifacts in the target repository match the historical artifacts in the source repository. Verification further comprises comparing commit data in the historical artifacts in the target repository with commit data in the historical artifacts in the source repository; and evaluating whether each commit data event in the historical artifacts in the target repository is equivalent to the corresponding commit data event in the historical artifacts in the source repository. Evaluating further comprises logging a commit data event in the historical artifacts in the target repository which is not equivalent to a corresponding commit data event in the historical artifacts in the source repository; and reviewing the logging results.

1 Claim, 5 Drawing Sheets

(56) References Cited

U.S. PATENT DOCUMENTS

| | | | | |
|---|---|---|---|---|
| 6,536,037 | B1* | 3/2003 | Barrese | G06F 8/71 703/2 |
| 7,107,589 | B1* | 9/2006 | Tal | G06F 8/65 707/999.003 |
| 7,117,486 | B2 | 10/2006 | Wong et al. | |
| 8,051,410 | B2 | 11/2011 | Marfatia et al. | |
| 8,719,770 | B2 | 5/2014 | Balani et al. | |
| 8,938,733 | B2* | 1/2015 | Draper | G06F 8/65 702/182 |
| 9,189,504 | B2 | 11/2015 | McGillin | |
| 2006/0106889 | A1 | 5/2006 | Mannby | |
| 2008/0148221 | A1 | 6/2008 | Letkeman | |
| 2009/0083343 | A1* | 3/2009 | Wall | G06F 8/71 |
| 2011/0161376 | A1 | 6/2011 | Dickson | |
| 2012/0079456 | A1* | 3/2012 | Kannan | G06F 8/77 717/124 |
| 2013/0152047 | A1* | 6/2013 | Moorthi | G06F 11/368 717/124 |
| 2014/0149435 | A1* | 5/2014 | Sisman | G06F 11/362 707/751 |
| 2015/0082290 | A1 | 3/2015 | Peled | |
| 2015/0370555 | A1 | 12/2015 | Cowan | |
| 2015/0378724 | A1* | 12/2015 | Balachandran | G06F 11/3636 717/123 |

OTHER PUBLICATIONS

Gethers, Malcom, et al. "Integrated impact analysis for managing software changes." Software Engineering (ICSE), 2012 34th International Conference on. IEEE, 2012.*

Dit, Bogdan, et al. "Feature location in source code: a taxonomy and survey." Journal of software: Evolution and Process 25.1 (2013): 53-95.*

Ying, Annie TT, et al. "Predicting source code changes by mining change history." IEEE transactions on Software Engineering 30.9 (2004): 574-586.*

List of IBM Patents or Patent Applications Treated as Related Form.

Mell, P., et al., "The NIST Definition of Cloud Computing", National Institute of Standards and Technology Special Publication 800-145, Sep. 2011, pp. 1-7, U.S. Department of Commerce, United States.

Varis, K. et al., "WinMerge 2.14 Help", WinMerge website (manuall.winmerge.org), Jan. 15, 2016, pp. 1-28, caputred on Wayback Machine Internet Archive (archive.org), United States.

List of IBM Patents or Patent Applications Treated as Related.

* cited by examiner

METHOD FOR VERIFYING HISTORICAL ARTIFACTS IN DISPARATE SOURCE CONTROL SYSTEMS

BACKGROUND

Embodiments of the invention relate to verifying historical artifacts in disparate source control systems.

As source control systems evolve, the popularity of existing systems fades and new systems rise to fame. Developers creating new projects can easily begin using the latest and greatest source control system. However, developers on legacy projects that want to leverage new source control systems must migrate their code, and, ideally, their code's history. Tools exist to migrate code from existing source control systems to newer source control systems, but most of these tools do not verify that the history of commits and comments are accurate, leaving the person in charge of the migration to manually verify potentially hundreds or thousands of events are accurate to ensure historical artifacts are preserved.

SUMMARY

Embodiments of the invention relate to a method for verifying historical artifacts in disparate source control systems. The method comprises obtaining historical artifacts from a target repository; obtaining historical artifacts from a source repository; and verifying the historical artifacts in the target repository match the historical artifacts in the source repository. Verification further comprises comparing commit data in the historical artifacts in the target repository with commit data in the historical artifacts in the source repository; and evaluating whether each commit data event in the historical artifacts in the target repository is equivalent to the corresponding commit data event in the historical artifacts in the source repository. Evaluating further comprises logging a commit data event in the historical artifacts in the target repository which is not equivalent to a corresponding commit data event in the historical artifacts in the source repository; and reviewing the logging results. In one embodiment, the metadata for the source repository and the target repository is in a standardized format. In another embodiment, commit data comprises: commit changes, comments, authorship information, metadata and timestamps. In an embodiment of the present invention, a tolerance is established by a user for evaluating the commit data in the target and source repositories. Further, the tolerance is a maximum number of differences between a commit data event in the historical artifacts in the target repository and a corresponding commit data event in the historical artifacts in the source repository. In one embodiment, each commit data event logged has a number of differences greater than the tolerance.

These and other features, aspects and advantages of the present invention will become understood with reference to the following description, appended claims and accompanying figures.

DETAILED DESCRIPTION

Figure 1:
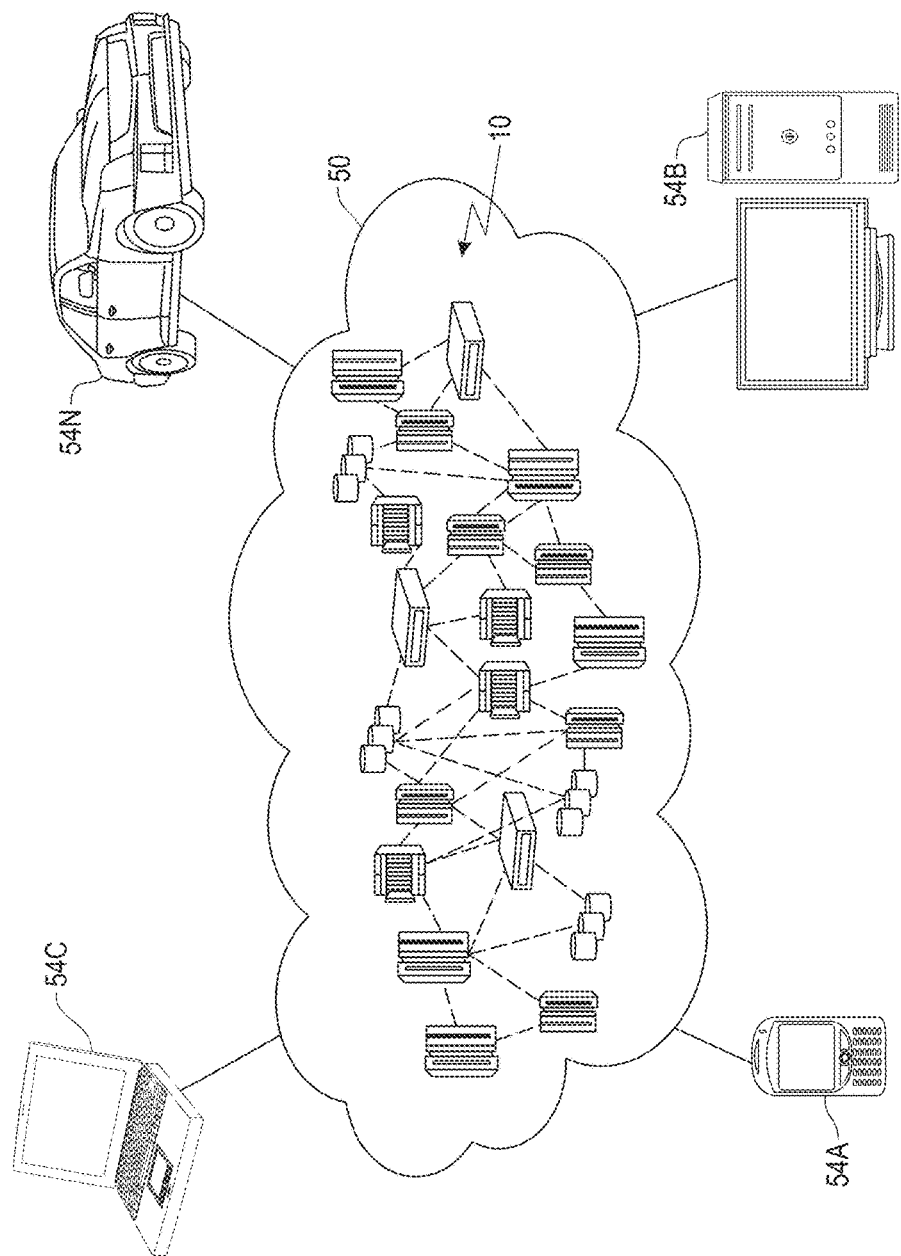
FIG. 1 depicts a cloud computing environment, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed. Also, the verification system could be used to verify various points in time of the repositories. For example, it may be advantageous to verify that the code is identical at important baselines or for every delivery/commit.

In an embodiment, the system is configured with location and credentials to the source and target (migrated) repositories. Implementations are provided for the source and target repository to obtain and standardize individual commit and comment metadata for comparison. The system is configurable to match identically or to a certain percentage of tolerance. The system verifies that all historical artifacts are identical in both repositories. A confidence level is established, after review of the verification logs, that the historical artifacts are preserved.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
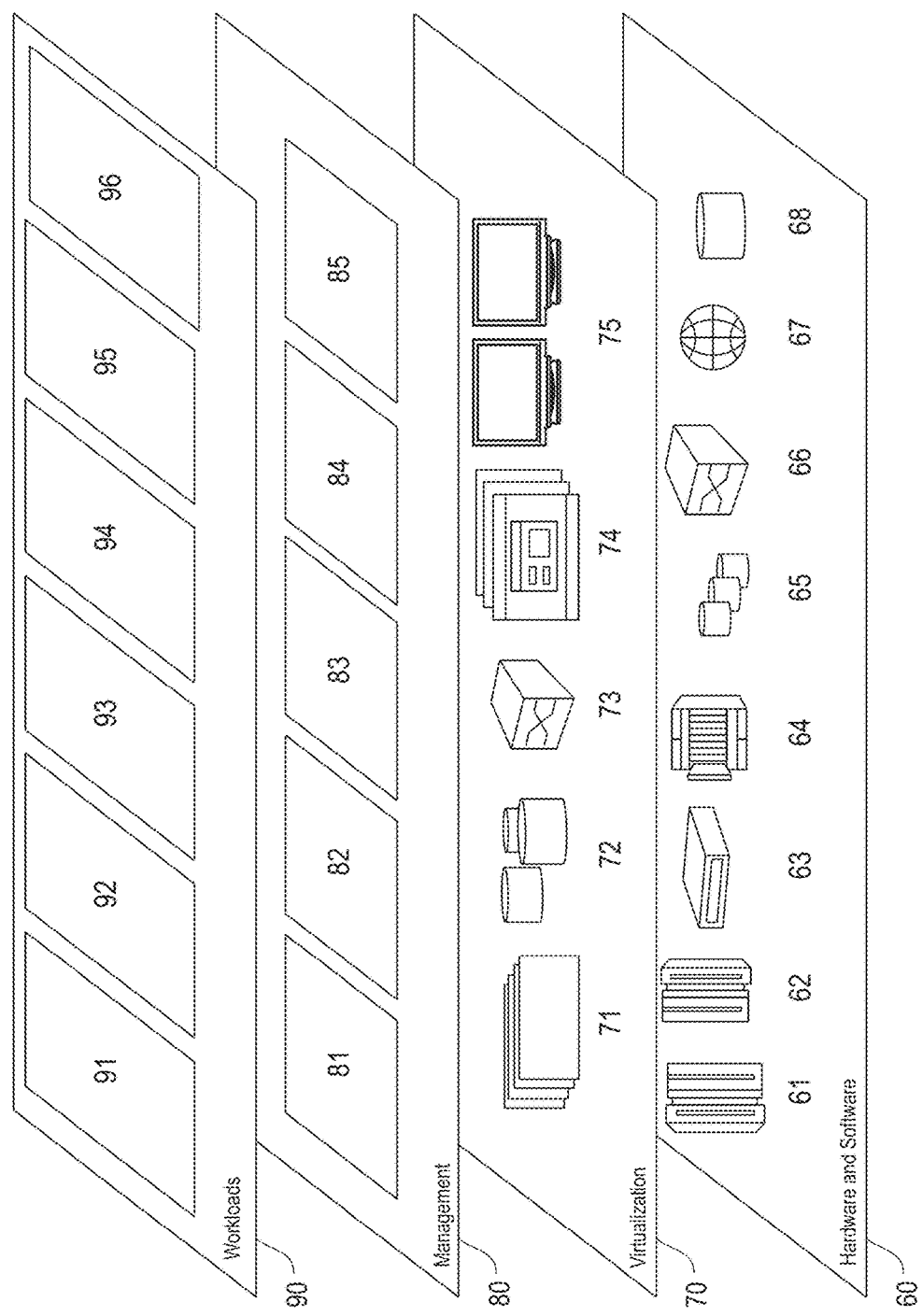
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and verifying historical artifacts in disparate source control systems 96. As mentioned above, all of the foregoing examples described with respect to FIG. 2 are illustrative only, and the invention is not limited to these examples.

It is understood all functions of one or more embodiments as described herein may be typically performed in the computing environment 50 (FIG. 1), the network 300 (FIG. 3), or performed by the system 400 (FIG. 4), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
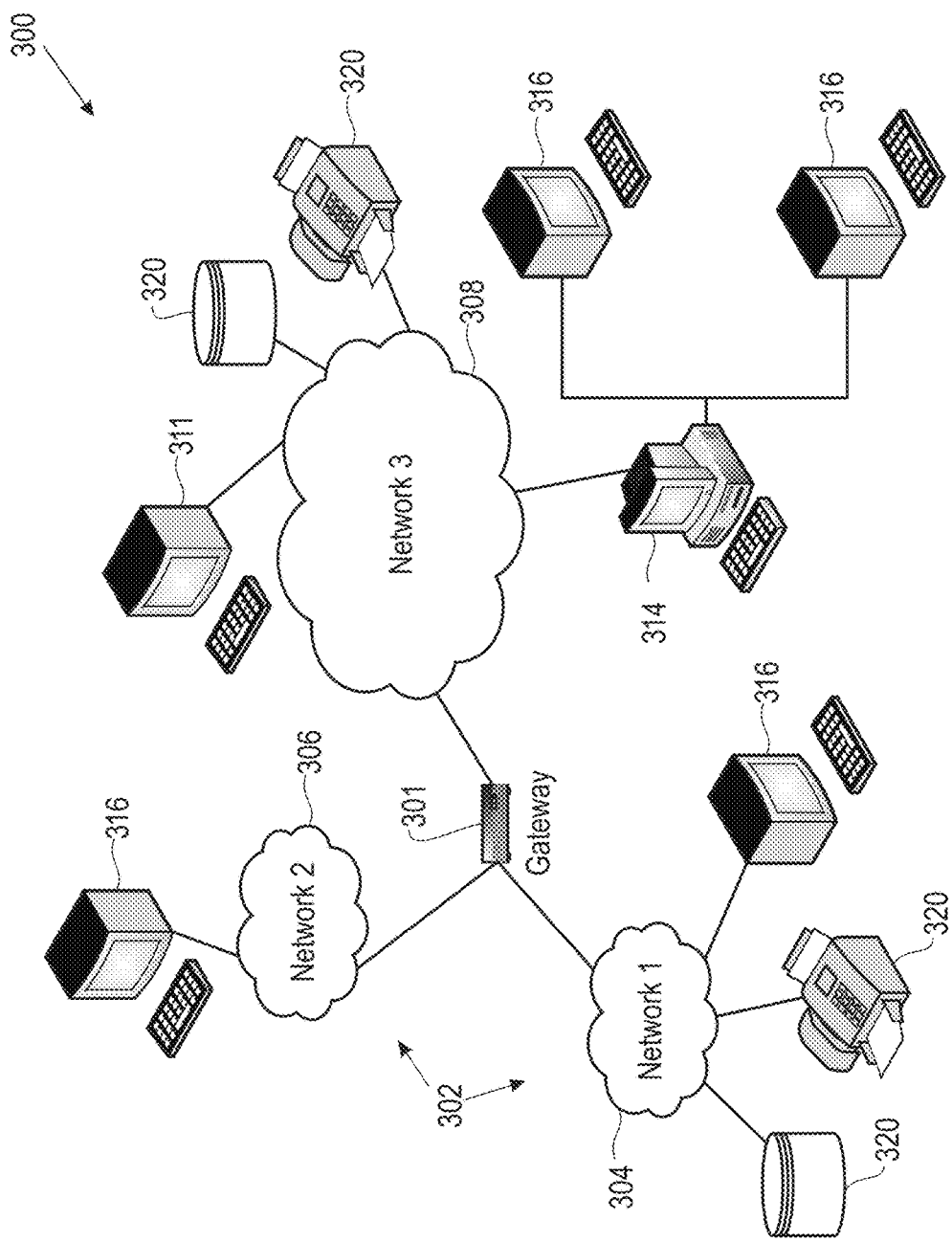
FIG. 3 is a network architecture for verifying historical artifacts in disparate source control systems, according to an embodiment of the present invention.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc. In one embodiment, the network architecture 300 employs a POSIX® based file system.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
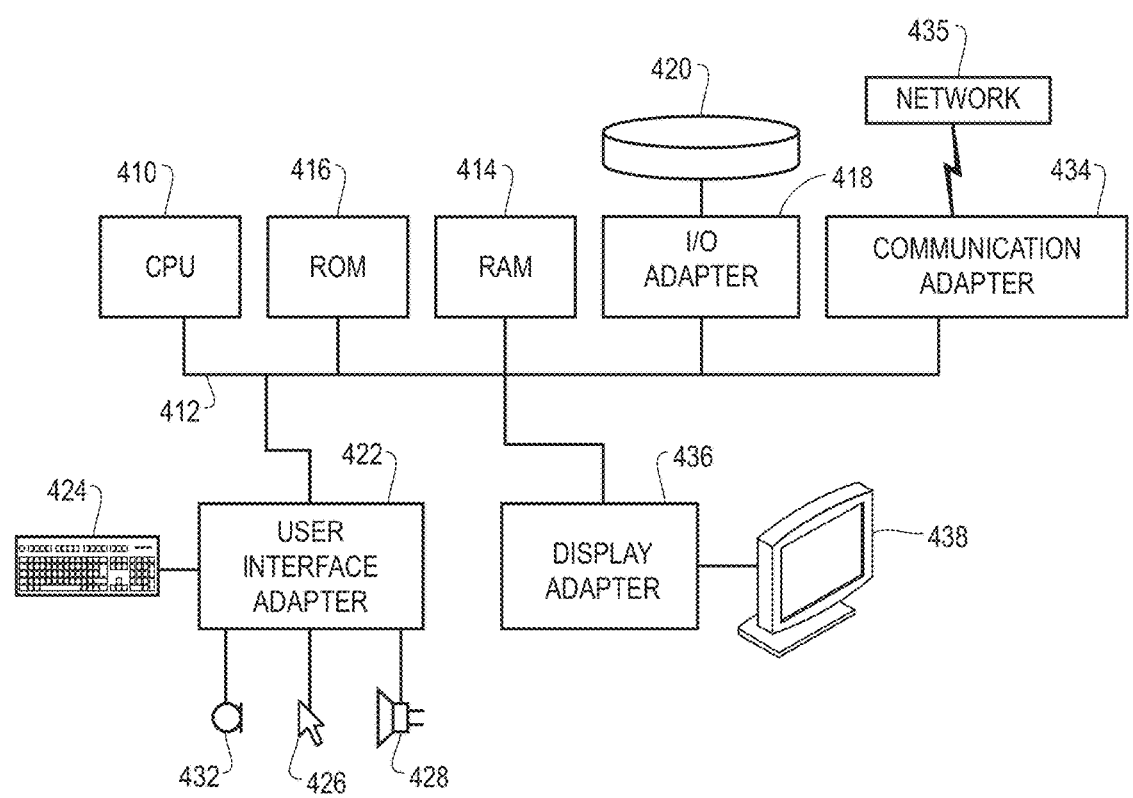
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
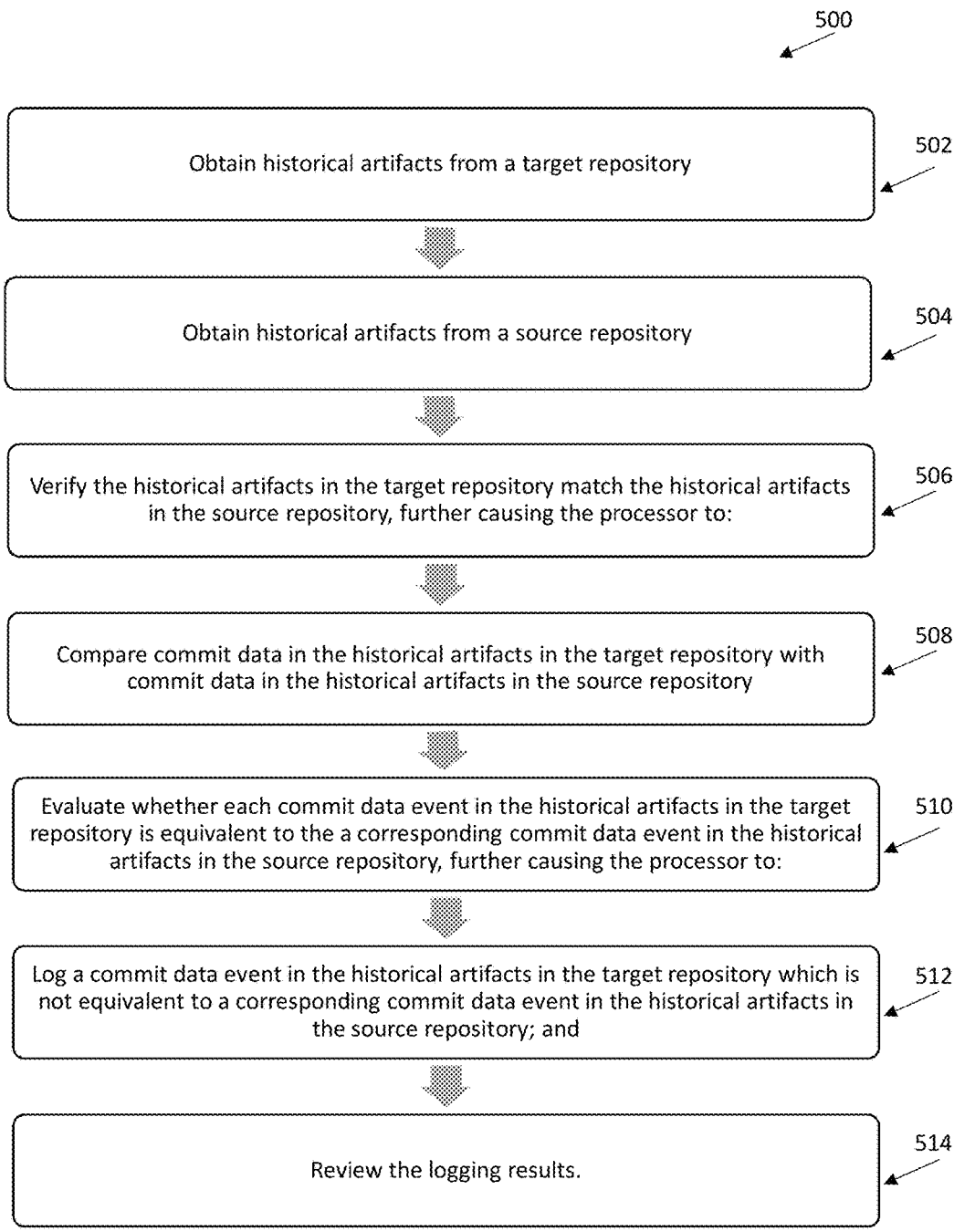
FIG. 5 illustrates a block diagram for a process for verifying historical artifacts in disparate source control systems, according to one embodiment.

FIG. 5 illustrates a block diagram for a process 500 for verifying historical artifacts in disparate source control systems, according to one embodiment of the present invention. A computer program product comprising a computer readable storage medium having program instructions embodied therewith, the program instructions executable by a processor to cause the processor to begin in block 502 and obtain historical artifacts from a target repository.

After completion of block 502, the process 500 continues with block 504 wherein program instructions cause the processor to obtain historical artifacts from a source repository. After block 504, the process 500 continues with block 506 where the processor is instructed to verify the historical artifacts in the target repository match the historical artifacts in the source repository.

In one embodiment of the present invention, verification in block 506 comprises sub-block 508 where the processor is instructed to compare commit data in the historical artifacts in the target repository with commit data in the historical artifacts in the source repository. After completion of sub-block 508, the process 500 continues with sub-block 510 where the processor is instructed to evaluate whether each commit data event in the historical artifacts in the target repository is equivalent to the corresponding commit data event in the historical artifacts in the source repository.

In one embodiment, the evaluation block 510 comprises sub-blocks 512 and 514. Block 512 is performed when the processor is instructed to log a commit data event in the historical artifacts in the target repository which is not equivalent to a corresponding commit data event in the historical artifacts in the source repository. In an alternative embodiment, in block 512 the processor will interrupt the verification process when the historical artifacts in the target repository is not equivalent to a corresponding commit data event in the historical artifacts in the source repository. After completion of block 512, the process 500 continues with block 514 wherein a review of the logging results is performed.

In one embodiment, the metadata for the source repository and the target repository is in a standardized format. In another embodiment, commit data comprises: commit changes, comments, authorship information, metadata and timestamps. In an embodiment of the present invention, a tolerance is established by a user for evaluating the commit data in the target and source repositories. Further, the tolerance is a maximum number of differences between a commit data event in the historical artifacts in the target repository and a corresponding commit data event in the historical artifacts in the source repository. In one embodiment, each commit data event logged has a number of differences greater than the tolerance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for verifying historical artifacts in disparate source control systems, comprising:
    obtaining historical artifacts from a target repository;
    obtaining historical artifacts from a source repository;
    verifying the historical artifacts in the target repository match the historical artifacts in the source repository, further comprising:
    comparing commit data in the historical artifacts in the target repository with commit data in the historical artifacts in the source repository; and
    evaluating whether each commit data event in the historical artifacts in the target repository is equivalent to a corresponding commit data event in the historical artifacts in the source repository, further comprising:
        logging a commit data event in the historical artifacts in the target repository which is not equivalent to a corresponding commit data event in the historical artifacts in the source repository; and
        reviewing the logging results;
    wherein:
    the metadata for the source repository and the target repository is in a standardized format;
    commit data comprises: commit changes, comments, authorship information, metadata and timestamps;
    a tolerance is established by a user for evaluating the commit data in the target and source repositories;
    the tolerance is a maximum number of differences between a commit data event in the historical artifacts in the target repository and a corresponding commit data event in the historical artifacts in the source repository; and
    each commit data event logged has a number of differences greater than the tolerance.

* * * * *